(12) United States Patent
Hileman et al.

(10) Patent No.: US 7,233,910 B2
(45) Date of Patent: Jun. 19, 2007

(54) SYSTEM AND METHOD FOR DETERMINING EQUIVALENCY FACTORS FOR USE IN COMPARATIVE PERFORMANCE ANALYSIS OF INDUSTRIAL FACILITIES

(75) Inventors: Michael J. Hileman, McKinney, TX (US); Robert Broadfoot, Richardson, TX (US); Richard B. Jones, The Woodlands, TX (US)

(73) Assignee: HSB Solomon Associates, LLC, Dallas, TX (US)

( * ) Notice: Subject to any disclaimer, the term of this patent is extended or adjusted under 35 U.S.C. 154(b) by 0 days.

(21) Appl. No.: 11/488,266

(22) Filed: Jul. 18, 2006

(65) Prior Publication Data

US 2006/0259352 A1 Nov. 16, 2006

Related U.S. Application Data

(63) Continuation of application No. 10/913,728, filed on Aug. 9, 2004, now abandoned.

(60) Provisional application No. 60/493,150, filed on Aug. 7, 2003.

(51) Int. Cl.
*G06F 11/34* (2006.01)
(52) U.S. Cl. .................................................... 705/11
(58) Field of Classification Search ................... None
See application file for complete search history.

(56) References Cited

U.S. PATENT DOCUMENTS

| | | | | |
|---|---|---|---|---|
| 5,500,795 A | * | 3/1996 | Powers et al. | 705/11 |
| 5,684,964 A | * | 11/1997 | Powers et al. | 705/11 |
| 6,509,730 B1 | * | 1/2003 | Afsah | 324/158.1 |
| 6,732,055 B2 | | 5/2004 | Bagepalli et al. | |
| 6,738,744 B2 | * | 5/2004 | Kirovski et al. | 704/273 |
| 6,877,034 B1 | * | 4/2005 | Machin et al. | 709/223 |
| 6,988,092 B1 | * | 1/2006 | Tang et al. | 707/1 |
| 2001/0032195 A1 | * | 10/2001 | Graichen et al. | 705/400 |
| 2001/0053940 A1 | * | 12/2001 | Horn et al. | 700/32 |

(Continued)

FOREIGN PATENT DOCUMENTS

WO WO00/20939 * 4/2000

(Continued)

OTHER PUBLICATIONS

Ricketts, Richard, Survey points to practices that reduce refinergy maintenance spending Oil & Gas Journal, Jul. 4, 1994, vol. 92, No. 27, pp. 37-41.*

(Continued)

*Primary Examiner*—Romain Jeauty
*Assistant Examiner*—Scott L. Jarrett
(74) *Attorney, Agent, or Firm*—Akin Gump Strauss Hauer & Feld LLP

(57) ABSTRACT

The present invention provides a system and method for determining equivalency factors for use in comparative performance analysis of industrial facilities by determining a target variable and a plurality of characteristics of the target variable. Each of the plurality of characteristics is ranked according to value. Based on ranking value, the characteristics are divided into categories. Based on the sorted and ranked characteristics, a data collection classification system is developed. Data is collected according to the data collection classification system. The data is validated, and based on the data, an analysis model is developed. The analysis model then calculates the equivalency factors.

17 Claims, 9 Drawing Sheets

U.S. PATENT DOCUMENTS

| | | | |
|---|---|---|---|
| 2002/0161624 A1 | 10/2002 | Bradlee | |
| 2002/0165750 A1* | 11/2002 | Fouquet | 705/8 |
| 2002/0194329 A1* | 12/2002 | Alling | 709/224 |
| 2003/0046137 A1* | 3/2003 | Dickerson, Jr. | 705/10 |
| 2003/0050814 A1* | 3/2003 | Stoneking et al. | 705/7 |
| 2003/0149613 A1* | 8/2003 | Cohen et al. | 705/11 |
| 2003/0182181 A1* | 9/2003 | Kirkwood et al. | 705/11 |
| 2004/0032420 A1* | 2/2004 | Allen et al. | 345/700 |
| 2004/0088179 A1 | 5/2004 | Cogen et al. | |
| 2004/0143467 A1 | 7/2004 | McAllister et al. | |
| 2004/0158478 A1 | 8/2004 | Zimmerman | |
| 2004/0215545 A1 | 10/2004 | Murakami | |
| 2004/0230443 A1 | 11/2004 | McMorris, III et al. | |
| 2004/0243462 A1* | 12/2004 | Stier | 705/11 |
| 2005/0091102 A1* | 4/2005 | Retsina | 705/10 |
| 2005/0283428 A1 | 12/2005 | Bartels | |

FOREIGN PATENT DOCUMENTS

| | | |
|---|---|---|
| WO | WO 02/067152 A1 * | 8/2002 |
| WO | WO 03/058386 A2 | 7/2003 |

OTHER PUBLICATIONS

Stoddard, Brooke, The Gas is always greener American Gas, Dec. 1994/Jan. 1995, vol. 75, No. 11.*

Waguespack, Kevin, Internal benchmarking can increase refinery profits Oil & Gas Journal, Jul. 17, 1995, vol. 93, No. 29, pp. 57-61.*

Key work practices lower refinery operating costs Oil & Gas Journal, Apr. 8, 1996, vol. 94, No. 15, p. 50.*

Solomon Associates and IndustrialEvolution.com Partner to Deliver Remote-Hosted Industry Performance Benchmarking Services, Business Wire, Sep. 8, 2000.*

Hileman, Michael, Best practices determine refinery pacesetter performance Oil & Gas Journal, Oct. 8, 2001, vol. 99, No. 44, pp. 44-47.*

Wraige, Helen, Measure up to the best Professional Engineering, May 1, 2002, vol. 15, No. 8, pp. 32-33.*

Plant information (performance benchmarking) Hydrocarnon Processing, Sep. 2001, vol. 80, No. 9.*

SA-Inc.com Web Pages Nov.-Dec. 2001, Retrieved from Archive. org Jan. 11, 2006.*

RIS-Resolution.com Web Pages Feb. 2002, Jun. 2002, Retrieved from Archive.org Jan. 11, 2006.*

IndustrialEvolution.com Web Pages Apr.-Nov. 2001, Retrieved from Archive.org Aug. 15, 2006.*

Bogen, Christopher et al., Benchmarking for Best Practices R.R. Donneley & Sons, 1994, ISBN: 0-07-006375-3.*

Camp, Robert C., Benchmarking The Search for Industry Best Practices that Lead to Superior Performance ASQC Quality Press, 1989, ISBN: 0-87389-058-2.*

Brophy, William, Financial Performance: Benchmarking Chemical Market Reporter, Apr. 7, 2003, vol. 263, No. 14, pp. 16-18.*

DeVore, Jay L., Probability and Statistics for Engineering and the Sciences Fourth Edition, Brooks/Cole Publishing, 1995, ISBN: 0-534-24264-2.*

Christian J. Colton, Keys to a Successful Carbon Dioxide Market: Program Structure and Secondary Trading, Cantor Fitzgerald Environmental Brokerage Service, pp. 61-74.

Solomon Associates, Webpage: www.sa-inc.com, Date: Jan. 11, 2006.

Resolution Integration Solution, Inc., Webpage: www.ris-resolution.com, Date: Jan. 12, 2006.

* cited by examiner

Cat Cracker Example

| Cat Cracker Number | Reactor Design | Staff Training | Staffing Levels | Emission Equipment | Maintenance Practices | Feed Capacity | | Actual Cash OPEX | Predicted Cash OPEX | Error |
|---|---|---|---|---|---|---|---|---|---|---|
| #1 | 1.50 | 30 | 50 | 1 | 3.74 | 45.0 | | 3.20 | 3.2043 | 0.00 |
| #2 | 1.35 | 25 | 28 | 1 | 2.30 | 40.0 | | 3.33 | 3.3510 | 0.02 |
| #3 | 1.10 | 60 | 8 | 0 | 1.93 | 30.0 | | 2.75 | 2.7527 | 0.00 |
| #4 | 2.10 | 35 | 23 | 1 | 3.74 | 50.0 | | 4.26 | 4.1752 | 0.08 |
| #5 | 1.00 | 25 | 5 | 0 | 2.63 | 25.0 | | 2.32 | 2.3215 | 0.00 |

Constraints
Minimum: -3.0, -3.0, 0.0, -1.0, 0.0, 0.0
Maximum: 0.0, 1.0, 40.0, 1.0, 4.0, 4.0

Equivalency Factor: 0.9245, -0.0021, -0.0313, 0.0000, 0.0000, 0.1382

Sum 0.10

Pipeline and Tankfarm Example

| Facility Number | Type of Fluid | Number of Input and Output Stations | Total Main Pump Driver | Number of Tanks | Total Nominal Tank Capacity | Actual Cash OPEX | Predicted Cash OPEX | Error |
|---|---|---|---|---|---|---|---|---|
| #1 | 1 | 8 | 74.0 | 34 | 1,158 | ????? | ????? | ??? |
| #2 | 2 | 16 | 29.0 | 0 | 0 | ????? | ????? | ??? |
| #3 | 1 | 2 | 5.8 | 7 | 300 | ????? | ????? | ??? |
| #4 | 1 | 5 | 4.9 | 6 | 490 | ????? | ????? | ??? |
| #5 | 1 | 2 | 5.4 | 8 | 320 | ????? | ????? | ??? |
| #6 | 2 | 2 | 2.5 | 33 | 191 | ????? | ????? | ??? |
| #7 | 1 | 3 | 8.2 | 0 | 0 | ????? | ????? | ??? |
| #8 | 2 | 2 | 8.7 | 0 | 0 | ????? | ????? | ??? |
| #9 | 1 | 3 | 15.0 | 10 | 180 | ????? | ????? | ??? |
| #10 | 1 | 9 | 12.0 | 22 | 860 | ????? | ????? | ??? |
| #11 | 1 | 4 | 20.0 | 5 | 206 | ????? | ????? | ??? |
| #12 | 2 | 9 | 9.3 | 0 | 0 | ????? | ????? | ??? |
| #13 | 2 | 12 | 6.2 | 0 | 0 | ????? | ????? | ??? |
| #14 | 1 | 5 | 41.4 | 19 | 430 | ????? | ????? | ??? |
| #15 | 2 | 8 | 8.2 | 0 | 0 | ????? | ????? | ??? |
| #16 | 1 | 8 | 96.8 | 31 | 1,720 | ????? | ????? | ??? |
| #17 | 1 | 2 | 15.0 | 8 | 294 | ????? | ????? | ??? |
| | | | | | | | Sum | ??? |

Constraints
Minimum  2000        0      0       0    500    100
Maximum  11301.1   435.4  170.8  1340.1  6111

Equivalency Factor

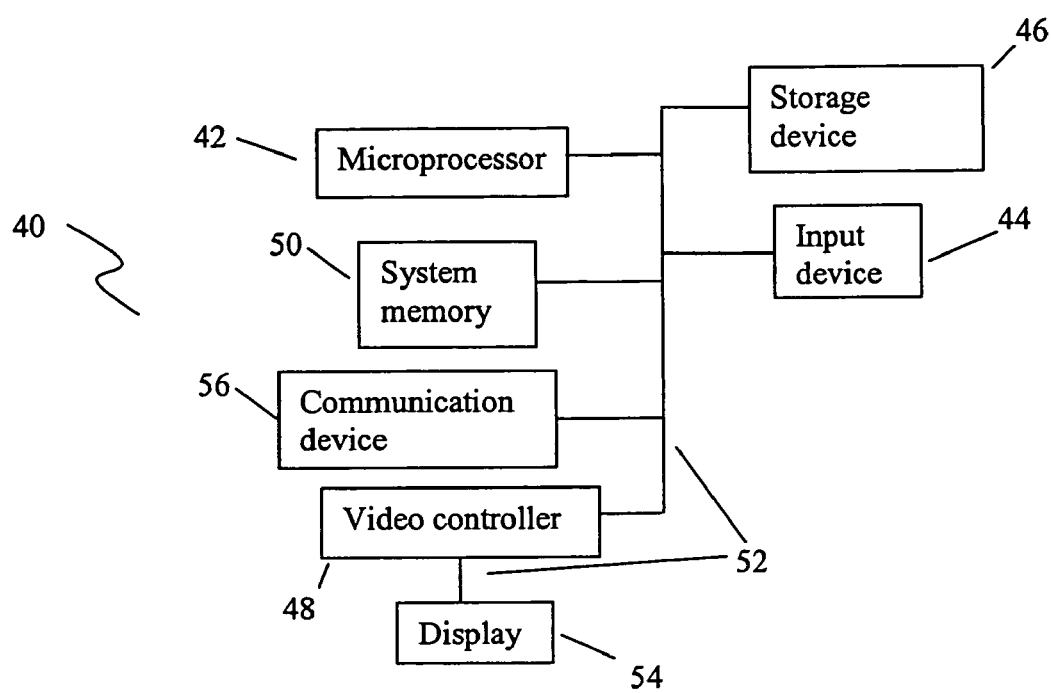

SYSTEM AND METHOD FOR DETERMINING EQUIVALENCY FACTORS FOR USE IN COMPARATIVE PERFORMANCE ANALYSIS OF INDUSTRIAL FACILITIES

This application claims the benefit of U.S. Provisional Application No. 60/493,150, filed Aug. 7, 2003.

The present invention relates to comparing the performance of manufacturing, refining, petrochemical, pipeline, power generating, distribution, and other industrial facilities. More specifically, the invention relates to determining the equivalency factors that enable the conversion of production and other data from a facility to a form that can be directly compared to the production and other data from a another facility that has different characteristics.

SUMMARY

The present invention provides a new and unique system and method for determining equivalency factors for use in comparative performance analysis of industrial facilities by determining a target variable, and a plurality of characteristics of the target variable. The characteristics are sorted and a data collection classification system is developed. The data classification system is used to quantitatively measure the differences in characteristics. Data is collected according to the data collection classification system. The data is validated, and based on the data, an analysis model is developed to compare predicted target variable to actual target variable for a set of industrial facilities. The model is used to then find the best set of complexity factors to minimize the difference in predicted versus actual target variable values in the model.

BRIEF DESCRIPTION OF THE DRAWINGS

FIG. 5 is another example implementation of an embodiment of the invention using example data.

FIG. 6 is another example implementation of an embodiment of the invention using example data.

FIG. 9 is an illustrative node for implementing a method of the invention.

DETAILED DESCRIPTION

The following disclosure provides many different embodiments, or examples, for implementing different features of a system and method for accessing and managing structured content. Specific examples of components, processes, and implementations are described to help clarify the invention. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
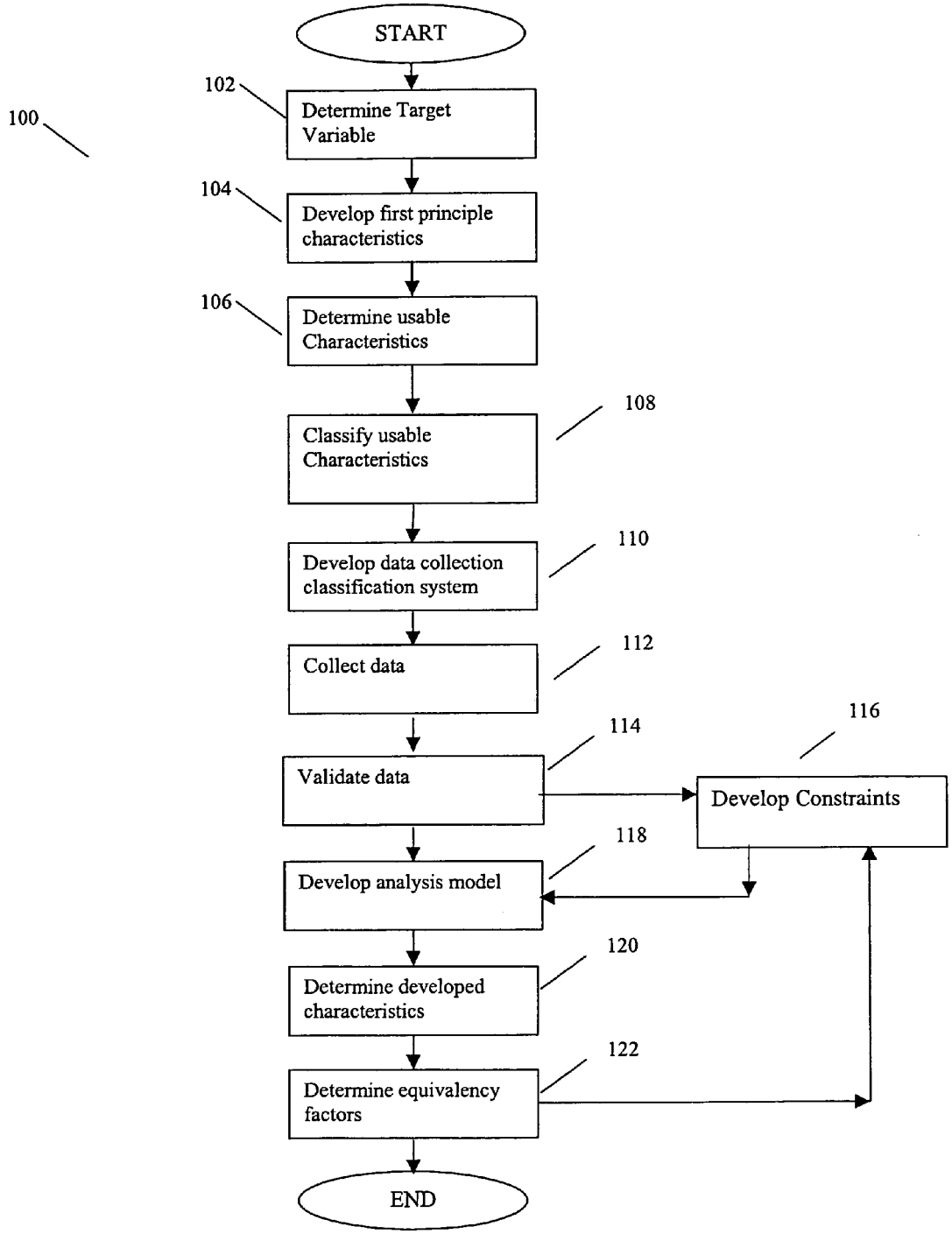
FIG. 1 is a flowchart illustrating the operation of an embodiment of the invention.

Referring now to FIG. 1, an example 100 of the operation of one embodiment of a method for determining equivalency factors for use in comparative performance analysis of industrial facilities is shown. At step 102, a target variable ("Target Variable") is selected. The target variable is a quantifiable attribute (such as total operating expense, financial result, capital cost, operating cost, staffing, product yield, emissions, energy consumption, or any other quantifiable attribute of performance). Target Variables could be in manufacturing, refining, chemical (including (petrochemicals, organic and inorganic chemicals, plastics, agricultural chemicals, and pharmaceuticals), Olefins plant, chemical manufacturing, pipeline, power generating, distribution, and other industrial facilities. The Target Variables could also be for different environmental aspects. Target Variables could also be in other forms and types of industrial and commercial industries.

At step 104, the first principle characteristics are identified. First principle characteristics are the physical or fundamental characteristics of a facility or process that are expected to determine the Target Variable. Common brainstorming or team knowledge management techniques can be used to develop the first list of possible characteristics for the Target Variable. In one embodiment, all of the characteristics of an industrial facility that may cause variation in the Target Variable when comparing different manufacturing facilities are identified as first principle characteristics.

Figure 2:
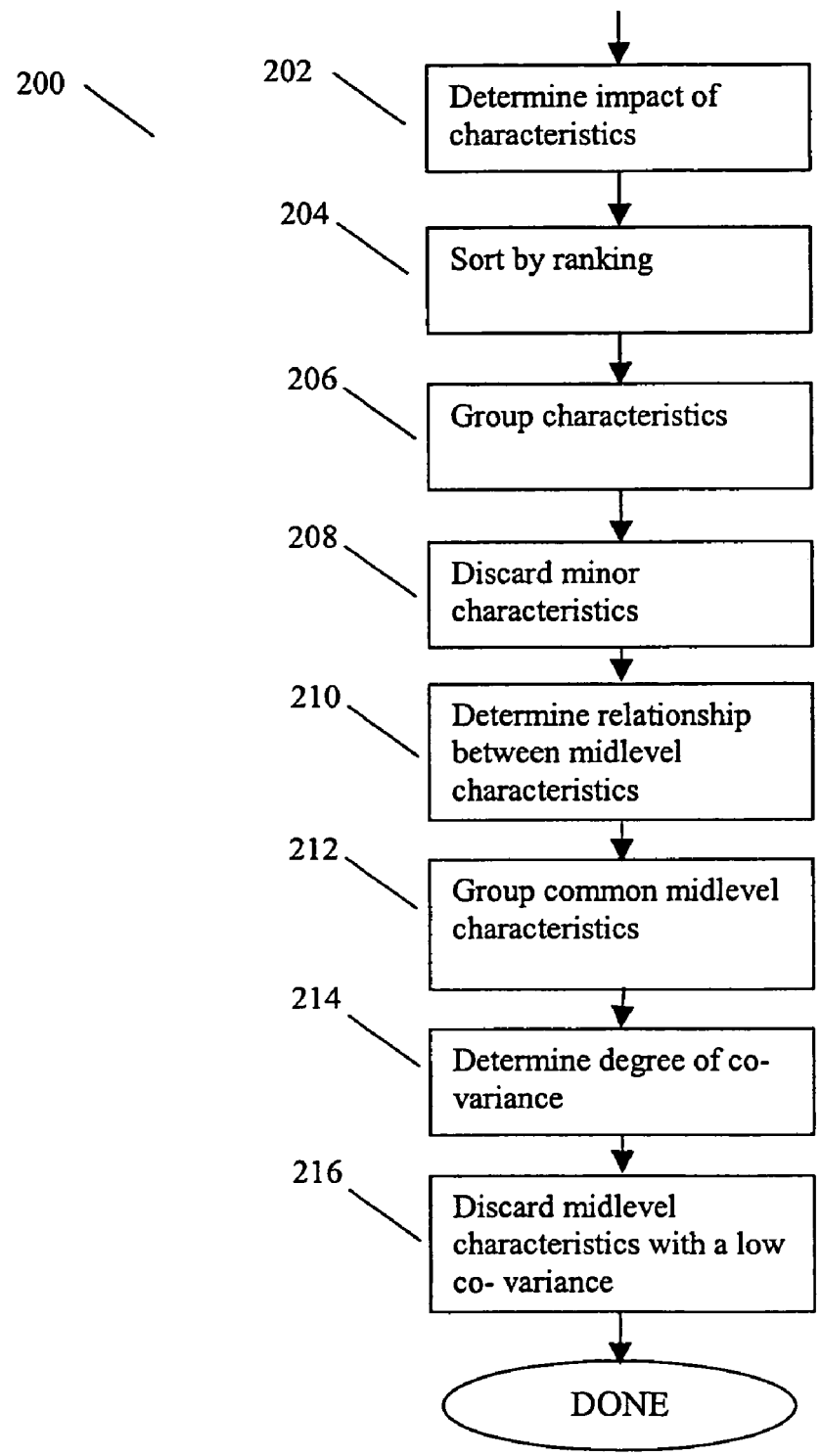
FIG. 2 is a flowchart illustrating the operation of another embodiment of the invention.

At step 106, the primary first principle characteristics are determined. As will be understood by those skilled in the art, many different options are available to determine the primary first principle characteristics. One such option is shown in FIG. 2.

At step 108, the primary characteristics are classified. Potential classifications include discrete, continuous, or ordinal. Discrete characteristics are those characteristics that can be measured using a selection between two or more states, for example a binary determination, such as "yes" or "no." An example discrete characteristic could be "Duplicate Equipment." The determination of "Duplicate Equipment" is "yes, the facility has duplicate equipment" or "no, there is no duplicate equipment." Continuous characteristics are directly measurable. An example of a continuous characteristic could be the "Feed Capacity," since it is directly measured as a continuous variable. Ordinal characteristics are characteristics that are not readily measurable. Instead, ordinal characteristics can be scored along an ordinal scale reflecting physical differences that are not directly measurable. It is also possible to create ordinal characteristics for variables that are measurable or binary. An example of an ordinal characteristic would be refinery configuration between three typical major industry options. These are presented in ordinal scale by unit complexity:

1.0 Atmospheric Distillation
    2.0 Catalytic Cracking Unit
    3.0 Coking Unit Ordinal variables are in rank order, and generally do not contain information about any useful quality of measurement. In the above example, the difference between the complexity of the 1.0 unit and the 2.0 unit, does not necessarily equal the complexity difference between the 3.0 unit and the 2.0 unit.

Variables placed in an ordinal scale may be converted to an interval scale for development of equivalency factors. To convert ordinal variables to interval variables requires the development of a scale upon which the differences between units are on a measurable scale. The process to develop an interval scale for ordinal characteristic data can rely on the understanding of a team of experts of the characteristic's scientific drivers. The team of experts can first determine, based on their understanding of the process being measured and scientific principle, the type of relationship between different physical characteristics and the Target Variable. The relationship may be linear, logarithmic, a power function, a quadratic function or any other mathematical relationship. Then the experts can optionally estimate a complexity factor to reflect the relationship between characteristics and variation in Target Variable. Complexity factors are the exponential power used to make the relationship linear between the ordinal variable to the target variable resulting in an interval variable scale.

At step 110, a data collection classification system is developed. For those characteristics categorized as continuous, a data collection system that allows a quantification of the characteristics is needed. A system of definitions will need to be developed to ensure data is collected in a consistent manner. For characteristics categorized as binary, a simple yes/no questionnaire is used to collect data. A system of definitions may need to be developed to ensure data is collected in a consistent manner. For characteristics categorized as ordinal, a measurement scale can be developed as described above.

To develop a measurement scale for ordinal characteristics, at least four methods to develop a consensus function can be employed. In one embodiment, an expert or team of experts can be used to determine the type of relationship that exists between the characteristics and the variation in Target Variable. In another embodiment, the ordinal characteristics can be scaled (for example 1,2,3 . . . n for n configurations). By plotting the target value versus the configuration, the configurations are placed in progressive order of influence. In utilizing the arbitrary scaling method, the determination of the Target Variable value relationship to the ordinal characteristic is forced into the optimization analysis, as described in more detail below. In this case, the general optimization model described in Equation 1.0 can be modified to accommodate a potential non-linear relationship.

In yet another embodiment, the ordinal measurement can be scaled as discussed above, and then regressed against the data to make a plot of Target Variable versus the ordinal characteristic to be as nearly linear as possible. In a further embodiment, a combination of the foregoing embodiments can be utilized to make use of the available expert experience, and available data quality and data quantity of data.

Once a relationship is agreed, a measurement scale is developed. For instance, a single characteristic may take the form of five different physical configurations. The characteristics with the physical characteristics resulting in the lowest impact on variation in Target Variable will be given a scale setting score. This value may be assigned to any non-zero value. In this example, the value assigned is 1.0. The characteristics with the second largest impact on variation in Target Variable will be a function of the scale setting value, as determined by a consensus function. The consensus function is arrived at by using the measurement scale for ordinal characteristics as described above. This is repeated until a scale for the applicable physical configurations is developed.

At step 112, the classification system is used to collect data. The data collection process can begin with the development of data input forms and instructions. In many cases, data collection training seminars are conducted to assist in data collection. Training seminars may improve the consistency and accuracy of data submissions. A consideration in data collection is the definition of the industrial facility boundaries being analyzed. Data input instructions will provide definitions of what facilities, costs and staffing are to be included in data collection. The data collection input forms may provide worksheets for many of the reporting categories to aid in the preparation of data for entry.

The data that is collected can come for several sources, including existing historical data, newly gathered historical data from existing facilities and processes, simulation data from model(s), or synthesized experiential data derived from experts in the field. Additionally, no data at all can be used, in which case the determination of primary characteristics may be based on expert experience.

At step 114, the data is validated. Many data checks can be programmed into an interactive data collection system. The interactive data collection system should only accept data that passes the validation check or the check is overridden with appropriate authority. Validation routines may be developed to validate the data as it is collected. The validation routines can take many forms, including:

Range of acceptable data is specified

Ratio of one data point to another is specified where applicable

Data is cross checked against all other similar data submitted to determine outlier data points for further investigation Data is cross referenced to any previous data submission Judgment of experts After all input data validation is satisfied, the data is examined relative to all the data collected in a broad "cross-study" validation. This "cross-study" validation may highlight further areas requiring examination and may result in changes to input data.

Figure 3:
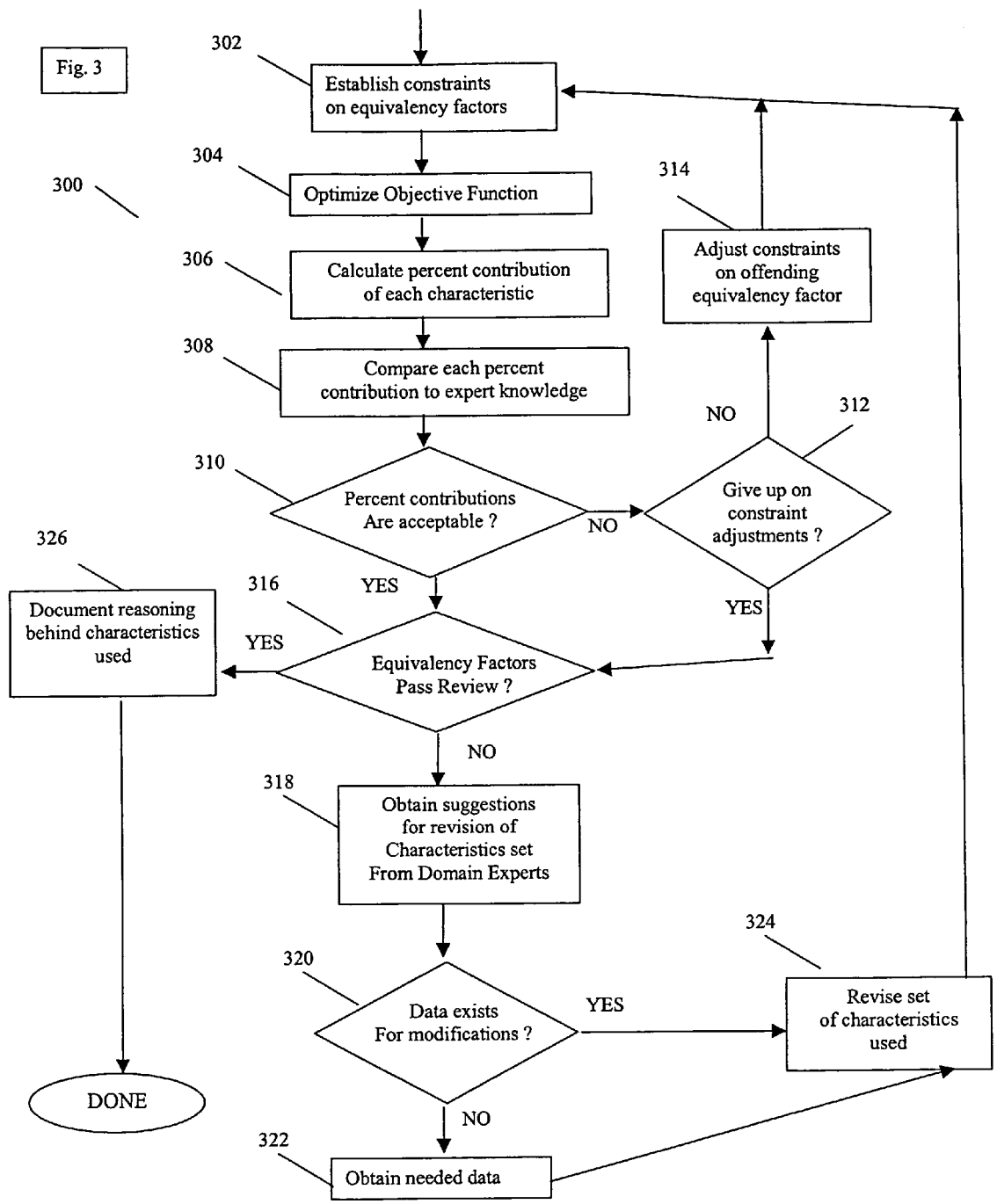
FIG. 3 is a flowchart illustrating the operation of another embodiment of the invention.

At step 116, constraints may be developed for use in solving the analysis model. These constraints could include constraints on the equivalence factor values. These can be minimum or maximum values, or constraints on groupings of values, or any other mathematical constraint forms. One method of determining the constraints is shown in FIG. 3.

At step 118, the analysis model is solved by applying optimization methods of choice with the collected data to determine the optimum set of complexity factors relating the Target Variable to the characteristics. In one embodiment, the generalized reduced gradient non-linear optimization method can be used. However, many other optimization methods could be utilized.

At step 120, developed characteristics may be determined. Developed characteristics are the result of any mathematical relationship that exists between one or more first principle characteristics and may be used to express the information represented by that mathematical relationship. In addition, if a linear general optimization model is utilized, then nonlinear information in the characteristics can be captured in developed characteristics. Determination of the developed characteristics form is accomplished by discussion with experts, modeling expertise, and by trial and refinement.

At step 122, the optimization model is applied to the primary first principle characteristics and the developed characteristics to determine the equivalence factors. In one embodiment, if developed characteristics are utilized, step 116 through step 122 may be repeated in an iterative fashion until the level of model accuracy desired is achieved.

Referring now to FIG. 2, one embodiment 200 of determining primary first principle characteristics 106 is shown. At step 202, the effect of each characteristic on the variation in the Target Variable between industrial facilities is determined. In one embodiment, the method is iteratively repeated, and an analysis model can be used to determine the effect of each characteristic. In another embodiment, a correlation matrix can be used. The effect of each characteristic may be expressed as a percentage of the total variation in the Target Variable in the initial data set. At step 204, each characteristic is ranked from highest to lowest based on its effect on the Target Variable. It will be understood by those skilled in the art that other ranking criteria could be used.

At step 206, the characteristics may be grouped into one or more categories. In one embodiment, the characteristics are grouped into three categories. The first category contains characteristics that effect a Target Variable at a percentage less than a lower threshold (for example, 5%). The second category are those characteristics with a percentage between the lower percentage and a second threshold (for example, 5% and 20%). The third category are those characteristics with a percentage over the second threshold (for example, 20%). Additional or fewer categories and different ranges are also possible.

At step 208, those characteristics with Target Variable average variation below a specific threshold may be removed from the list of characteristics. For example, this could include those characteristics in the first category (e.g., those characteristics with a percentage of less than 5%). It will be understood by those skilled in the art that other thresholds could be used, and multiple categories could be removed from the list of characteristics. In one embodiment, if characteristics are removed, the process is repeated starting at step 202 above. In another embodiment, no characteristics are removed from the list until determining whether another co-variant relationships exist, as described in step 212 below.

At step 210, the relationships between the mid-level characteristics are determined. Mid-level characteristics are characteristics that have a certain level of effect on the Target Variable, but individually do not influence the Target Variable in a significant manner. Using the illustrative categories, those characteristics in the second category are mid-level characteristics. Example relationships between the characteristics are co-variant, dependent, and independent. A co-variant relationship occurs when modifying one characteristic causes the Target Variable to vary, but only when another characteristic is present. For instance, in the scenario where characteristic "A" is varied, which causes the Target Variable to vary, but only when characteristic "B" is present, then "A" and "B" have a co-variant relationship. A dependent relationship occurs when a characteristic is a derivative of or directly related to another characteristic. For instance, when the characteristic "A" is only present when characteristic "B" is present, then A and B have a dependent relationship. For those characteristics that are not co-variant or dependent, they are categorized as having independent relationships.

At step 212, characteristics displaying dependence on each other may be resolved to remove dependencies and high correlations. There are several potential methods for resolving dependencies. Some examples include: (i) grouping multiple dependent characteristics into a single characteristic, (ii) removing all but one of the dependent characteristics, and (iii) keeping one of the dependent characteristics, and creating a new characteristic that is the difference between the kept characteristic and the other characteristics. After the dependencies are removed, the process may be repeated from step 202. In one embodiment, if the difference variable is insignificant it can be removed from the analysis in the repeated step 208.

At step 214, the characteristics are analyzed to determine the extent of the inter-relationships. In one embodiment, if any of the previous steps resulted in repeating the process, the repetition should be conducted prior to step 214. In some embodiments, the process may be repeated multiple times before continuing to step 214.

At 216, the characteristics that result in less than a minimum threshold change in the impact on Target Variable variation caused by another characteristic are dropped from the list of potential characteristics. An illustrative threshold could be 10%. For instance, if the variation in Target Variable caused by characteristic "A" is increased when characteristic "B" is present; the percent increase in the Target Variable variation caused by the presence of characteristic "B" must be estimated. If the variation of characteristic "B" is estimated to increase the variation in the Target Variable by less than 10% of the increase caused by characteristic "A" alone, characteristic "B" can be eliminated from the list of potential characteristics. Characteristic "A" can also be deemed then to have an insignificant impact on the Target Variable. The remaining characteristics are deemed to be the primary characteristics.

Referring now to FIG. 3, an example embodiment 300 for developing constraints for equivalency factors is shown. Constraints are developed on the equivalency factors, step 302. The objective function, as described below, is optimized to determine an initial set of equivalency factors, step 304.

At step 306 the percent contribution of each characteristic to the target variable is calculated. There are several methods of calculating the percent contribution of each characteristic. One method is the "Average Method," which is a two step process where the Total Average Impact is calculated and then the percent contribution of each characteristic is calculated. To calculate the Total Average Impact, the absolute values of the equivalency factors times the average value of each characteristic are summed as shown below:

Average Method Equation: $TAI = \Sigma_j |\alpha_j * avg_j(F_{ij})|$

TAI=Total Average Impact i=individual record referring to the facility j=individual first principle or developed characteristic $\alpha_j$=equivalency faction for the jth characteristic F=is a function of the measured first principle characteristics or developed characteristic for a facility. In the case where the first principle characteristic is used directly, F may be 1* characteristic$_{ij}$. In the case of a developed characteristic, F can be any function of the first principle characteristic(s) and other developed characteristic(s).

$avg_j(F_{ij})$=the average value of the measured first principle characteristics or developed characteristic over all facilities (over all j) in the analysis dataset Following the calculation of the Total Average Impact, the percent contribution of each characteristic is then calculated as shown below:

Percent Contribution Equation: $AI_j = \frac{|\alpha_j * avg_i(F_{ij})|}{TAI}$ $AI_j$=Average Impact of jth first principle or developed characteristic An alternate method is the "Summation of Records Method," which calculates the percent contribution of each characteristic by calculating the individual impacts from a summation of the impacts at each individual data record in the analysis dataset of facilities as shown below:

Summation of Records Equation: $AI_j$=average over all i $[|\alpha_j * F_{ij}|/\Sigma_k|\alpha_k * F_{ik}|]$ $AI_j$=Average Impact of jth first principle or developed characteristic
- i=the individual record referring to the facility
- j=individual first principle or developed characteristic
- k=individual first principle or developed characteristic
- $\alpha_j$=equivalency faction for the jth characteristic
- F=is a function of the measured first principle characteristics or developed characteristic for a facility.

The Summation of Records Method may be used if non-linearity exists in the impacts. It is contemplated that other methods to calculate impacts may be used.

With the individual percent contributions developed, the method proceeds to step 308, where each percent contribution is compared against expert knowledge. Domain experts will have an intuitive or empirical feel for the relative impacts of key characteristics to the overall target value. The contribution of each characteristic is judged against this expert knowledge.

At step 310 a decision is made about the acceptability of the individual contributions. If the contribution are found to be unacceptable the process continues to step 312. If they are found to be acceptable the process continues to step 316.

At step 312, a decision is made to address how the unacceptable results of the individual contributions are to be handled. The options are to adjust the constraints on the equivalency factors to affect a solution, or to decide that the characteristic set chosen can not be helped through constraint adjustment. If the developer gives up on constraint adjustment then the process proceeds to step 316. If the decision is made to achieve acceptable results through constraint adjustment then the process continues to step 314.

At step 314, the constraints are adjusted to increase or decrease the impact of individual characteristics in an effort to obtain acceptable results from the individual contributions. The process continues to step 302 with the revised constraints.

At step 316, peer and expert review of the equivalency factors developed may be performed to determine the acceptability of the equivalency factors developed. If the factors pass the expert and peer review, the process continues to step 326. If the equivalency factors are found to be unacceptable, the process continues to step 318.

At step 318, new approaches and suggestions for modification of the characteristics are developed by working with experts in the particular domain. This may include the creation of new developed characteristics, or the addition of new first principle to the analysis data set. At step 320, a determination is made as to whether data exists to support the investigation of the approaches and suggestions for modification of the characteristics. If the data exists, the process proceeds to step 324. If the data does not exist, the process proceeds to step 322.

At step 322, additional data is collected and obtained in an effort to attempt the corrections required to obtain a satisfactory solution. At step 324, the set of characteristics are revised in view of the new approaches and suggestions.

At step 326, the reasoning behind the selection of characteristics used is documented. This documentation can be used in explaining results for use of the equivalency factors.

Figure 4:
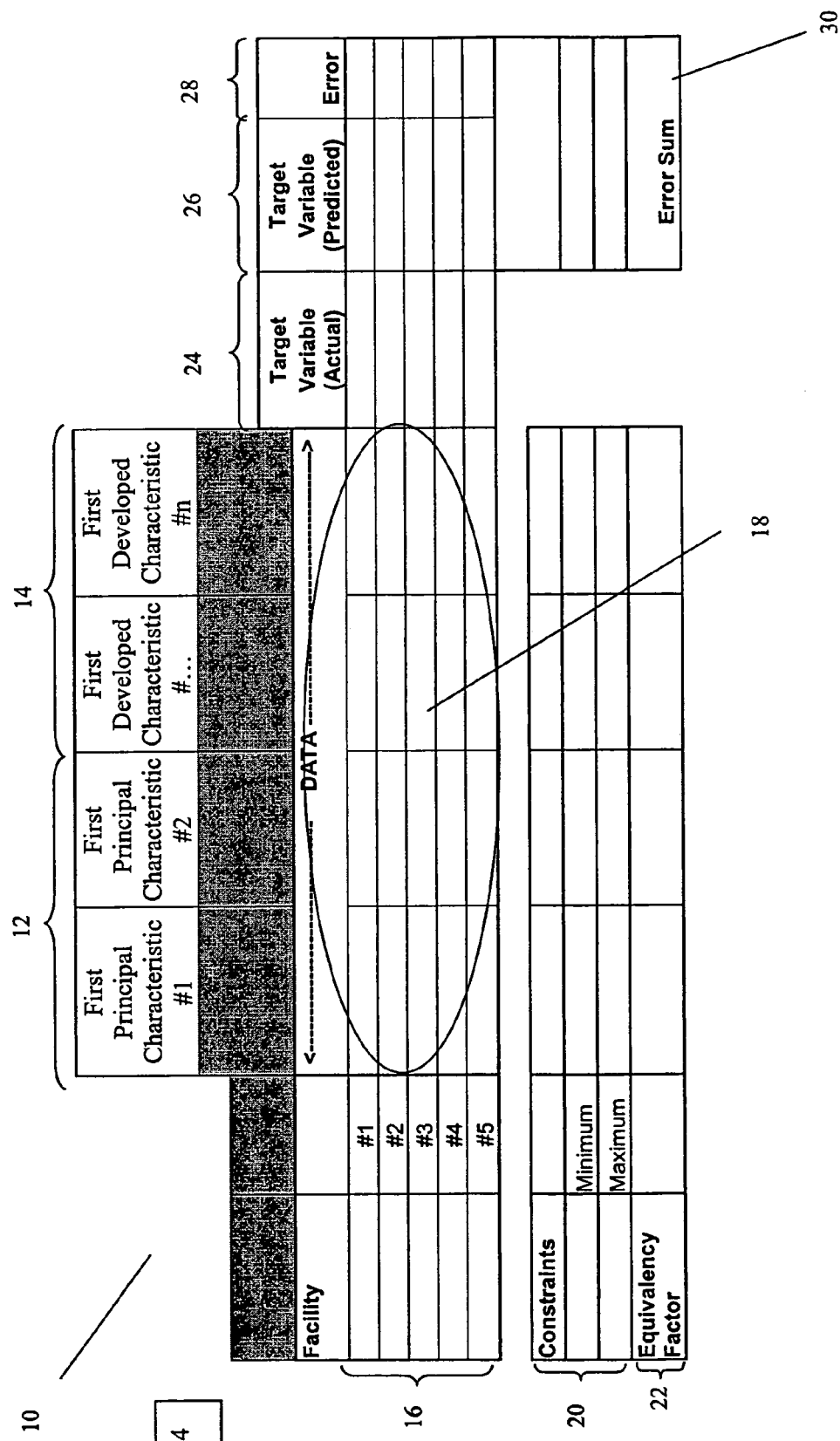
FIG. 4 is an example implementation of an embodiment of the invention.

Referring to FIG. 4, an example matrix 10 of a system for determining equivalency factors is illustrated. While matrix 10 can be expressed in many configurations, in this particular example, matrix 10 is constructed with the first principle characteristics 12 and developed characteristics 14 on one axis, and the different facilities 16 for which data has been collected on the other axis. For each first principle characteristic 12 at each facility 16, there is the actual data value 18. For each first principle characteristic 12 and developed characteristic 14, there is the equivalency factor 22 that will be computed with the optimization model. The constraints 20 limit the range of the equivalency factors 22. Constraints can be minimum or maximum values, or other mathematical functions or algebraic relationships. Moreover, constraints can be grouped and further constrained. Additional constraints on facility data, and relationships between data points similar to those used in the data validation step, and constraints of any mathematical relationship on the input data can also be employed. In one embodiment, the constraints to be satisfied during optimization apply only to the equivalency factors.

The target variable (actual) column 24 are the actual values of the target variable as measured for each facility. The target variable (predicted) column 26 are the values for the target value as calculated using the determined equivalency factors. The error column 28 are the error values for each facility as determined by the optimization model. The error sum 30 is the summation of the errors in error column 28. The optimization analysis, which comprises the Target Variable equation and an objection function, solves for the equivalency factors to minimize the error sum 30. In the optimization analysis, the equivalency factors ($\alpha_j$) are computed to minimize the error ($\epsilon_i$) over all facilities. The non-linear optimization process determines the set of equivalency factors that minimizes this equation for a given set of first principle characteristics, constraints, and a selected value.

The Target Variable is computed as a function of the characteristics and the yet to be determined equivalency factors. The Target Variable equation is expressed as:

$$\text{Target Variable equation: } TV_i = \sum_j \alpha_j f(\text{characteristic})_{ij} + \varepsilon_i$$

$TV_i$ is the measured Target Variable for facility i characteristic is a first principle characteristic i is the facility number j is the characteristic number $\alpha_j$ is the jth equivalency factor $\epsilon_i$ is the error of the model's TV prediction as defined by:
  Actual TV value−Predicted TV value for facility i The objective function has the general form:

$$\text{Objective Function: } \operatorname{Min}\left[\sum_{i=1}^{m} |\varepsilon_i|^p\right]^{1/p}, p \geq 1$$

i is the facility
m is the total number of facilities
p is a selected value

One common usage of the general form of objective function is for minimization of the absolute sum of error by using p=1 as shown below:

$$\text{Objective Function: } \operatorname{Min}\left[\sum_{i=1}^{m} |\varepsilon_i|\right]$$

Another common usage of the general form of objective function is using the least squares version corresponding to p=2 as shown below:

$$\text{Objective Function: } \operatorname{Min}\left[\sum_{i=1}^{m} |\varepsilon_i|^2\right]^{1/2}$$

Since the analysis involves a finite number of first principle characteristics and the objective function form corresponds to a mathematical norm, the analysis results are not dependent on the specific value of p. The analyst can select a value based on the specific problem being solved or for additional statistical applications of the objective function. For example, p=2 is often used due to its statistical application in measuring data and target variable variation and target variable prediction error.

A third form of the objective function is to solve for the simple sum of errors squared as given in Equation 5 below.

$$\text{Objective Function: } \operatorname{Min}\left[\sum_{i=1}^{m} |\varepsilon_i|^2\right]$$

While several forms of the objective function have been shown, other forms of the objective function for use in specialized purposes could also be used. Under the optimization analysis, the determined equivalency factors are those equivalency factors that result in the least difference between the summation and the actual value of the Target Variable after the model iteratively moves through each facility and characteristic such that each potential equivalency factor, subject to the constraints, is multiplied against the data value for the corresponding characteristic and summed for the particular facility.

For illustrative purposes, a more specific example of the system and method for determining equivalency factors for use in comparative performance analysis as illustrated in FIGS. 1-3 is shown. The example will be shown with respect to a major process unit in most petroleum refineries, known as a Fluidized Catalytic Cracking Unit (Cat Cracker). A Cat Cracker cracks long molecules into shorter molecules in the gasoline boiling range and lighter. The process in conducted at very high temperatures in the presence of a catalyst. In the process of cracking the feed, coke is produced and deposited on the catalyst. The coke is burned off the catalyst to recover heat and to reactivate the catalyst. The Cat Cracker has several main sections: Reactor, Regenerator, Main Fractionator, and Emission Control Equipment. Refiners desire to compare the performance of their Cat Crackers to the performance of Cat Crackers operated by their competition. This Cat Cracker example is for illustrative purposes and may not represent the actual results of applying this methodology to Cat Crackers, or any other industrial facility. Moreover, the Cat Cracker example is but one example of many potential applications of the used of this invention in the refining industry.

First, at step 102, the desired Target Variable will be "Cash Operating Costs" or "Cash OPEX" in a Cat Cracker facility. At step 104, the first principle characteristics that may affect Cash Operating Costs for a Cat Cracker might be:

| | | |
|---|---|---|
| Feed Quality | Feed Capacity | Emission Control Equipment |
| Regenerator Design | Staff Training | Main Fractionator Design |
| Staff Experience | Trade Union | Maintenance Practices |
| Location | Reactor Temperature | Regenerator Temperature |
| Age of Unit | Duplicate Equipment | Degree of Feed Preheat |
| Catalyst Type | Reactor Design | |

To determine the primary characteristics, step 106, this example has determined the effect of the first characteristics. For this example, the embodiment for determining primary characteristics as shown in FIG. 2 will be used. Moving to FIG. 2, at step 202, each characteristic is given an variation percentage. At step 204, the characteristics from the Cat Cracker Example are rated and ranked. The following chart shows the relative influence and ranking for the example characteristics:

| Characteristics | Category | Comment |
|---|---|---|
| Feed Quality | 3 | Several aspects of feed quality are key |
| Catalyst Type | 3 | Little effect on costs, large impact on yields |
| Reactor Design | 1 | Several key design factors are key |
| Regenerator Design | 3 | Several design factors are key |
| Staffing Levels | 2 | |
| Feed Capacity | 1 | Probably single-most highest impact |
| Emission Control Equipment | 2 | Wet versus dry is a key difference |
| Staff Experience | 3 | Little effect on costs |
| Staff Training | 2 | Little effect on costs |
| Main Fractionator Design | 3 | Little effect on costs, large impact on yields |
| Location | 3 | Previous data analysis shows this characteristic has little effect on costs |
| Trade Union | 3 | Previous data analysis shows this characteristic has little effect on costs |
| Maintenance Practices | 2 | Effect on reliability and "lost opportunity cost" |
| Age of Unit | 2 | Previous data analysis shows this characteristic has little effect on costs |
| Reactor Temperature | 3 | Little effect on costs |
| Regenerator Temperature | 3 | Little effect on costs |
| Duplicate Equipment | 3 | Little effect on costs |

In this embodiment, the categories are as follows:

|  | Percent of Average Variation in the Target Variable Between Facilities |
|---|---|
| Category 1 (Major Characteristics) | >20% |
| Category 2 (Midlevel Characteristics) | 5-20% |
| Category 3 (Minor Characteristics) | <5% |

It is understood that other embodiments could have any number of categories and that the percentage values that delineate between the categories may be altered in any manner.

Based on the above example rankings, the characteristics are grouped according to category, step 206. At step 208, those characteristics in Category 3 are discarded as being minor. Characteristics in Category 2 must be analyzed further to determine the type of relationship they exhibit with other characteristics, step 210. Each is classified as exhibiting either co-variance, dependence or independence, step 212. As an example:

Classification of Category 2 Characteristics Based on Type of Relationship

| Category 2 characteristics | Type of Relationship | If Co-variant or Dependent, Related Partner(s) |
|---|---|---|
| Staffing Levels | Independent | |
| Emission Equipment | Co-variant | Maintenance Practice |
| Maintenance Practices | Co-variant | Staff Experience |
| Age of Unit | Dependent | Staff Training |
| Staff Training | Co-variant | Maintenance Practice |

At step 214, the degree of the relationship of these characteristics is analyzed. Using this embodiment for the Cat Cracker example: Staffing levels, classified as having an Independent relationship, stays in the analysis process. Age of Unit is classified as having a dependent relationship with Staff Training. A dependent relationship means Age of Unit is a derivative of Staff Experience or vice versa. After further consideration, it is decided Age of Unit can be dropped from the analysis and the broader characteristic of Staff Training will remain in the analysis process. The three characteristics classified as having a co-variant relationship, Staff Training, Emission Equipment, Maintenance Practices, must be examined to determine the degree of co-variance.

It is determined that the change in Cash Operating Costs caused by the variation in Staff Training is modified by more than 30% by the variation in Maintenance Practices. Along the same lines, the change in Cash Operating Costs caused by the variation in Emission Equipment is modified by more than 30% by the variation in Maintenance Practices. Therefore, Maintenance Practices, Staff Training and Emission Equipment are retained in the analysis process.

It is also determined that the change in Cash Operating Costs caused by the variation in Maintenance Practice is not modified by more than the selected threshold of 30% by the variation in Staff Experience. Therefore, Staff Experience can be dropped from the analysis.

Continuing with the Cat Cracker example, and returning to FIG. 1, the remaining characteristics are categorized as continuous, ordinal or binary type measurement, step 108.

Classification of Remaining characteristics Based on Measurement Type

| Remaining characteristics | Measurement Type |
|---|---|
| Staffing Levels | Continuous |
| Emission Equipment | Binary |
| Maintenance Practices | Ordinal |
| Staff Training | Continuous |

In this Cat Cracker example: Maintenance Practices have an "economy of scale" relationship with Cash Operating Costs (which is the Target Variable). So the improvement in Target Variable improves at a decreasing rate as Maintenance Practices Improve. Based on historical data and experience, a complexity factor is assigned to reflect the economy of scale. In this particular example, a factor of 0.6 is selected.

As an example of coefficients, the complexity factor is often estimated to follow a power curve relationship. Using Cash Operating Costs as an example of a characteristic that typically exhibits an "economy of scale;" the effect of Maintenance Practices can be described with the following:

$$Target\ Variable_{facility\ A} = \left(\frac{Capacity_{facilityA}}{Capacity_{facilityB}}\right)^{ComplexityFactor} * Target\ Variable_{facilityB}$$

At step 110, a data collection classification system is developed. In this example, a questionnaire is developed to measure how many of ten key Maintenance Practices are in regular use at each facility. A system of definitions are used so that data is collected in a consistent manner. The data in terms of number of Maintenance Practices in regular use is converted to a Maintenance Practices Score using the 0.6 factor and "economy of scale" relationship as illustrated in the following table.

| Maintenance Practices Score | |
|---|---|
| Number Maintenance Practices In Regular Use | Maintenance Practices Score |
| 1 | 1.00 |
| 2 | 1.52 |
| 3 | 1.93 |
| 4 | 2.30 |
| 5 | 2.63 |
| 6 | 2.93 |
| 7 | 3.21 |
| 8 | 3.48 |
| 9 | 3.74 |
| 10 | 3.98 |

For illustrative purposes with respect to the Cat Cracker example, at step 112, data was collected and, at step 114, validated as follows:

Cat Cracker Data

| Unit of Measurement | Reactor Design Score | Staff Training Man Weeks | Staffing Levels Number People | Emission Equipment Yes = 1 No = 0 | Feed Capacity Barrels per Day | Maintenance Practices Score | Cash Operating Cost Dollars per Barrel |
|---|---|---|---|---|---|---|---|
| Facility #1 | 1.50 | 30 | 50 | 1 | 45 | 3.74 | 3.20 |
| Facility #2 | 1.35 | 25 | 28 | 1 | 40 | 2.30 | 3.33 |
| Facility #3 | 1.10 | 60 | 8  | 0 | 30 | 1.93 | 2.75 |
| Facility #4 | 2.10 | 35 | 23 | 1 | 50 | 3.74 | 4.26 |
| Facility #5 | 1.00 | 25 | 5  | 0 | 25 | 2.63 | 2.32 |

Constraint ranges were developed for each characteristics by the expert team to control the model so that the results are within a reasonable range of solutions.

Cat Cracker Model Constraint Ranges

|  | Reactor Design | Staff Training | Staffing Levels | Emission Equipment | Maintenance Practices | Feed Capacity |
|---|---|---|---|---|---|---|
| Minimum | −3.00 | −3.00 | −1.0 | −1.0 | 0.0 | 0.0 |
| Maximum | 0.00 | 1.00 | 40 | 0.0 | 4.0 | 4.0 |

At step 116, the results of the model optimization runs are shown below.

Model Results

| Characteristics | Equivalency Factors |
|---|---|
| Reactor Design | −0.9245 |
| Staff Training | −0.0021 |
| Staffing Levels | −0.0313 |
| Emission Equipment | 0.0000 |
| Maintenance Practices | 0.0000 |
| Feed Capacity | 0.1382 |

The model indicates Emission Equipment and Maintenance Practices are not significant drivers of variations in Cash Operating Costs between different Cat Crackers. This is indicated by the model finding zero values for equivalency factors for these two characteristics. Reactor Design, Staff Training, and Emission Equipment are found to be significant drivers.

In the case of both Emission Equipment and Maintenance Practices, the experts agree it is reasonable that these characteristics are not significant in driving variation in Cash Operating Cost. The experts feel there is a dependence effect not previously identified that fully compensates for the impact of Emission Equipment and Maintenance Practices.

A sample model configuration for the illustrative Cat Cracker example is shown in FIG. 5. The data 18, actual values 24, and the resulting equivalency factors 22 are shown. In this example, the error sum 30 is minimal, so developed characteristics are not necessary in this instance. In other examples, an error sum of differing values may be significant, and result in having to determine developed characteristics.

For additional illustrative purposes, a more specific example of the system and method for determining equivalency factors for use in comparative performance analysis as illustrated in FIGS. 1-3 is shown. The example will be shown with respect to pipelines and tank farms terminals. Pipelines and tank farms are assets used by industry to store and distribute liquid and gaseous feedstocks and products. The example is illustrative for development of equivalence factors for:

a. pipelines and pipeline systems alone b. tank farm terminals alone c. any combination of pipelines, pipeline systems and tank farm terminals.

This example is for illustrative purposes and may not represent the actual results of applying this methodology to any particular pipeline and tank farm terminal, or any other industrial facility.

First, at step 102, the desired Target Variable will be "Cash Operating Costs" or "Cash OPEX" in a pipeline asset. At step 104, the first principle characteristics that may affect Cash Operating Costs might be:

| Pipeline Related Characteristics | Tank Terminal Characteristics |
|---|---|
| Type of Fluid Transported | Fluid Class |
| Average Fluid Density | Number of Tanks |
| Number of Input and Output Stations | Total Number of Valves in Terminal |
| Total Installed Capacity | Total Nominal Tank Capacity |
| Total main pump driver KW | Annual Number of Tank Turnovers |
| Length of pipeline | Tank Terminal Replacement Value |
| Altitude change in pipeline | |
| Total Utilized Capacity | |
| Pipeline Replacement Value | |
| Pump Station Replacement Value | |

To determine the primary first principle characteristics, step 106, this example has determined the effect of the first characteristics. For this example, the embodiment for determining primary characteristics as shown in FIG. 2 will be used. Moving to FIG. 2, at step 202, each characteristic is given an impact percentage. This analysis shows that the pipeline replacement value and tank terminal replacement value that are used widely in the industry are characteristics that are dependent on more fundamental characteristics. Accordingly, in this instance, those values are removed from consideration for primary first principle characteristics. At step 204, the characteristics from are rated and ranked. The following chart shows the relative impact and ranking for the example characteristics:

| Characteristics | Category | Comment |
|---|---|---|
| Type of Fluid Transported | 2 | products and crude |
| Average Fluid Density | 3 | affects power consumption |
| Number of Input and Output Stations | 1 | more stations means more cost |
| Total Installed Capacity | 3 | surprisingly minor affect |
| Total Main Pump Driver KW | 1 | power consumption |
| Length of pipeline | 3 | no affect |
| Altitude change in pipeline | 3 | small affect by related to KW |
| Total Utilized Capacity | 3 | no effect |
| Pipeline Replacement Value | 3 | industry standard has no effect |
| Pump Station Replacement Value | 3 | industry standard has little effect |
| Fluid Class | 3 | no effect |
| Number of Tanks | 2 | important tank farm parameter |
| Total Number of Valves in Terminal | 3 | no effect |
| Total Nominal Tank Capacity | 2 | important tank farm parameter |
| Annual Number of Tank Turnovers | 3 | no effect |
| Tank Terminal Replacement Value | 3 | industry standard has little effect |

In this embodiment, the categories are as follows:

| | Per Cent of Average Variation in the Target Variable Between Facilities |
|---|---|
| Category 1 (Major Characteristics) | >15% |
| Category 2 (Midlevel Characteristics) | 7-15% |
| Category 3 (Minor Characteristics) | <7% |

It is understood that other embodiments could have any number of categories and that the percentage values that delineate between the categories may be altered in any manner.

Based on the above example rankings, the characteristics are grouped according to category, step 206. At step 208, those characteristics in Category 3 are discarded as being minor. Characteristics in Category 2 must be analyzed further to determine the type of relationship they exhibit with other characteristics, step 210. Each is classified as exhibiting either co-variance, dependence or independence as show below:

| Classification of Category 2 Characteristics Based on Type of Relationship | | |
|---|---|---|
| Category 2 characteristics | Type of Relationship | If Co-variant or Dependent, Related Partner(s) |
| Type of Fluid Transported | Independent | |
| Number of Input and Output Stations | Independent | |
| Total Main Pump Driver KW | Independent | |
| Number of Tanks | Independent | |
| Total Nominal Tank Capacity | Independent | |

At step 212 the dependent characteristics are resolved. In this example, there are no dependent characteristics that need to be resolved. At step 214, the degree of the co-variance of the remaining characteristics are analyzed and no characteristics are dropped.

The remaining variables were deemed to be primary characteristics in step 218.

Continuing with the Pipeline and Tank Farm example, and returning to FIG. 1, the remaining characteristics are categorized as continuous, ordinal or binary type measurement, step 108.

| Classification of Remaining characteristics Based on Measurement Type | |
|---|---|
| Remaining characteristics | Measurement Type |
| Type of Fluid Transported | Binary |
| Number of Input and Output Stations | Continuous |
| Total Main Pump Driver KW | Continuous |
| Number of Tanks | Continuous |
| Total Nominal Tank Capacity | Continuous |

At step 110, a data collection classification system is developed. In this example a questionnaire is developed to collect information from participating facilities on the measurements above.

At step 112, data was collected and, at step 114, validated as follows:

| | Pipe Line and Tank Farm Data | | | | |
|---|---|---|---|---|---|
| Characteristic Measurement Units | Type of Fluid 1 = Product 2 = Crude | Number of Input and Output Stations Count | Total Main Pump Driver KW | Number of Tanks Count | Total Nominal Tank Capacity KMT |
| Facility 1 | 1 | 8 | 74.0 | 34 | 1,158 |
| Facility 2 | 2 | 16 | 29.0 | 0 | 0 |
| Facility 3 | 1 | 2 | 5.8 | 7 | 300 |
| Facility 4 | 1 | 5 | 4.9 | 6 | 490 |
| Facility 5 | 1 | 2 | 5.4 | 8 | 320 |
| Facility 6 | 2 | 2 | 2.5 | 33 | 191 |
| Facility 7 | 1 | 3 | 8.2 | 0 | 0 |
| Facility 8 | 2 | 2 | 8.7 | 0 | 0 |
| Facility 9 | 1 | 3 | 15.0 | 10 | 180 |
| Facility 10 | 1 | 9 | 12.0 | 22 | 860 |
| Facility 11 | 1 | 4 | 20.0 | 5 | 206 |
| Facility 12 | 2 | 9 | 9.3 | 0 | 0 |
| Facility 13 | 2 | 12 | 6.2 | 0 | 0 |

-continued

Pipe Line and Tank Farm Data

| Characteristic Measurement Units | Type of Fluid 1 = Product 2 = Crude | Number of Input and Output Stations Count | Total Main Pump Driver KW | Number of Tanks Count | Total Nominal Tank Capacity KMT |
|---|---|---|---|---|---|
| Facility 14 | 1 | 5 | 41.4 | 19 | 430 |
| Facility 15 | 2 | 8 | 8.2 | 0 | 0 |
| Facility 16 | 1 | 8 | 96.8 | 31 | 1,720 |
| Facility 17 | 1 | 2 | 15.0 | 8 | 294 |

In Step 116, constraints were also developed on the equivalency factors by the expert as given below.

Equivalency Factor Constraints

| | Type of Fluid | Number of Input and Output Stations | Total Main Pump Driver | Number of Tanks | Total Nominal Tank Capacity |
|---|---|---|---|---|---|
| Minimum | 0 | 0 | 0 | 134 | 0 |
| Maximum | 2000 | 700 | 500 | 500 | 100 |

At step 116, the results of the model optimization runs are shown below.

Model Results

| Characteristics | Equivalency Factors |
|---|---|
| Type of Fluid Transported | 1301.1 |
| Number of Input and Output Stations | 435.4 |
| Total Main Pump Driver KW | 170.8 |
| Number of Tanks | 134.0 |
| Total Nominal Tank Capacity | 6.11 |

In step 118 it was determined that there was no need for developed characteristics for this example. Thus the final equivalency factors are those determined in the analysis model step above.

FIG. 6 shows the analysis performed on the pipeline and tank farm example. This example shows but one of many potential applications of this invention to the pipeline and tank farm industry.

It is understood that this methodology could be applied to many different industries and facilities. For example, this methodology could be applied to the power generation industry (such as developing equivalency factors for predicting operating expense for single cycle and combined cycle generating stations that generate electrical power from any combination of boilers, steam turbine generators, combustion turbine generators and heat recovery steam generators). In another example, this methodology could be applied to develop equivalency factors for predicting the annual cost for ethylene manufacturers of compliance with environmental regulations associated with continuous emissions monitoring and reporting from ethylene furnaces. In one embodiment, the equivalency factors would apply to both environmental applications and chemical industry applications.

Figure 7:
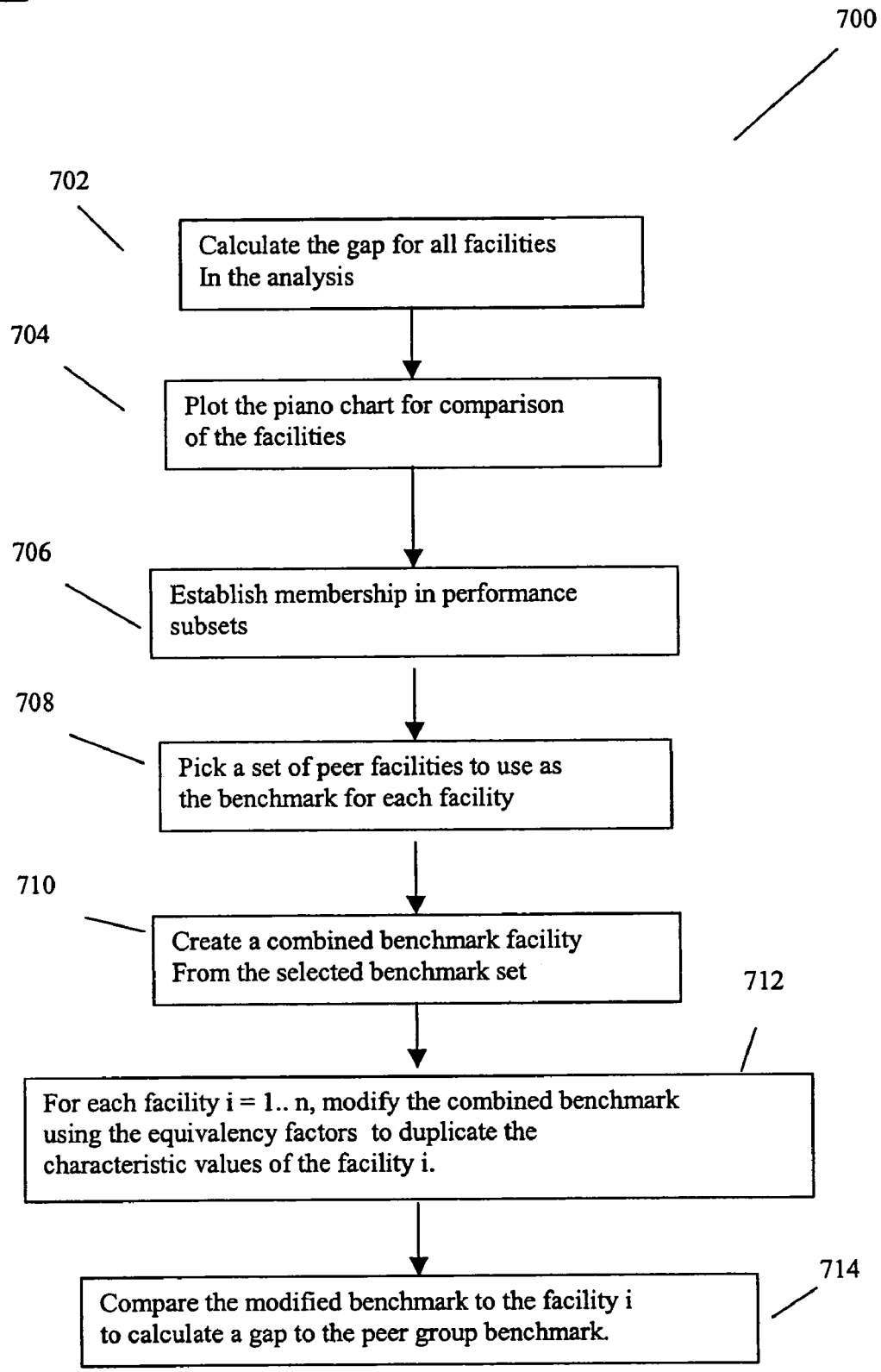
FIG. 7 is a flowchart illustrating an example implementation of an embodiment of the invention.

Once equivalency factors have been developed, the factors can be utilized to allow comparison of any one facility's data to another or to compare data across multiple facilities in an industry segment. Referring now to FIG. 7, an example embodiment 700 for using equivalency factors to establish a standard to be used for comparison between facilities is shown.

At step 702, the gap for all facilities are calculated. The gap is calculated by first determining the predicted value using the equivalency factors. This predicted value may be referred to as the "Equivalent Value" or "EV". The different between the actual Target Value and the Equivalent value is the gap for a particular facility as calculated in accordance with the following equations:

$$EV_i = \sum_{j=1}^{} \alpha_j F_{ij}$$

$$Gap_i = TV_i - EV_i$$

Figure 8:
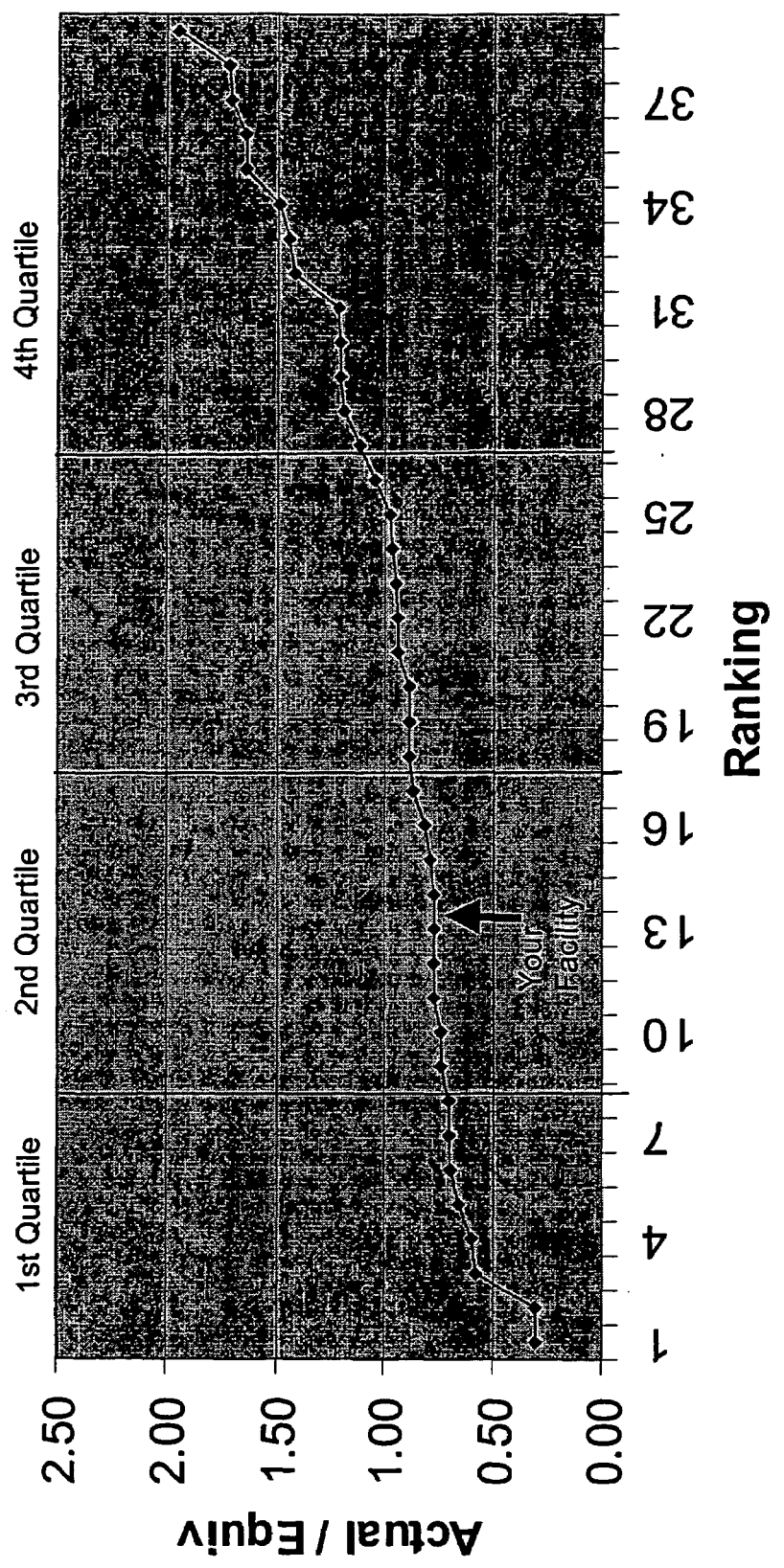
FIG. 8 is a graph depicting an example use of equivalency factors to compare performance of facilities using equivalency factors.

At step 704, the ratio of target variable to equivalent is calculated and plotted. In one embodiment, a piano chart can be used for analysis of comparative performance. An example piano chart for the generation example is given in FIG. 8. The equations below are used to develop this information.

$PR_i = TV_i / EV_i$ $PR_i$ = Performance Ratio of facility $TV_i$ = Actual Target Value of facility $EV_i$ = Equivalent Value of facility The set of performance ratios in the analysis are then rank ordered from low to high and plotted on the piano chart for discussion with individual participant's facilities.

It is recognized that the actual gap could be used in a similar manner and use of gap rather than ratio is included in this disclosure. Using a ratio permits the "hiding" of gap information while still providing to peers in the study a qualitative value for comparative performance.

At step 706, the rank ordered list of ratios is used to determine membership in performance subgroups. Subgroups can be established as any fraction of the total participants. Typical subgroups include:
  a. Halves (top and bottom)
  b. Quartiles ($1^{st}$, $2^{nd}$, $3^{rd}$ and $4^{th}$ quartiles)
  c. Deciles ($1^{st}$ through $10^{th}$ deciles) Participants are advised of the rank membership, and their actual position on the piano chart is indicated.

At step 708, a customized set of one or more facilities can optionally be selected as the standard for a comparison of all records to be included in the analysis. At this point the facilities to be selected for the measurement standard group for this analysis are arbitrary. Typical value selections include:

- the predicted equivalent value EV
- the average of all values for each characteristic
- the combined average for a set of one or more facilities demonstrating the maximum performance ratio
- the combined average for a set of one or more facilities demonstrating a minimum performance ratio
- the combined average for a set of one or more facilities contained in any of the performance subgroups
- the combined average for a set of one or more facilities demonstrating the lowest performance ratio or most positive gap
- the combined average of a set from a geographic or economic subset
- a set of facilities that the customer considers to be their competitors
- a set of facilities of equal size and complexity
- any criteria selected to achieve the desired comparison At step 710, the set of facilities selected as the benchmark are combined into one single benchmark point. In one embodiment, this can be accomplished by taking the average of the target value of the facilities selected as the benchmark and the average of each characteristic as the single benchmark facility.

At step 712, for each facility, the benchmark is adjusted to the actual characteristic values of each individual facility as shown below:

$$Equiv_{2\text{-}1} = TV_2 * EV_1 / EV_2$$

At step 714, the gap between the performance of each individual facility in the peer group is calculated from the performance of the adjusted benchmark, and the actual performance of the target facility as shown below:

$$GAP_i = Equiv_{2\text{-}1} - TV(actual)_i$$

For illustrative purposes, two facilities will be compared using the equivalency factors developed in the power generation industry. First, the equivalency factors must be developed. The following data will be used for determining the equivalency factors.

| Initial Characteristics | |
|---|---|
| HRSG | count of heat recovery steam generators |
| CTG | count of combustion turbine generators |
| STG | count of steam turbine generators |
| BOIL | count of combustion boilers |
| NDC | net dependable capacity |
| SVC Factor | fraction of hours in the year that the facility is operated |
| NetMWH | megawatts generated in a year |
| PurGas | yearly economic value of purge gas |
| PurLiquid | yearly economic value of purge liquid |
| ACTStarts | actual count of starts in a year |
| NCF | Net Capacity Factor |
| NOF | Net Operating Factor |

The primary characteristics for use were determined to be the following:

| Primary Characteristics | |
|---|---|
| C2 (a developed characteristic) | HRSG + STG + BOIL |
| NDC | net dependable capacity |
| SVC Factor | fraction of hours in the year that the facility is operated |
| C3 (a developed characteristic) | NCF-NOF |

The equivalency factors are developed using the collected data, which results in the following:

| Equivalancy Factors | |
|---|---|
| C2 | 674.3 |
| NDC | 10.4 |
| SVC Factor | 440.7 |
| C3 | −46.0 |

Below is the example data for two facilities to be compared.

| | Target Variable | C2 | NDC | SVC Factor | C3 |
|---|---|---|---|---|---|
| Facility 1 | $6,690 | 7.0 | 470 | 1.00 | 0.0 |
| Facility 2 | $2,082 | 1.0 | 97 | 0.979 | −1.92 |

The first step is to pick one of the facilities as the standard. For this example, Facility 1 will be used.

Using the developed equivalency factors, Facility 2's values are modified to place it on the same basis as Facility 1. This is done by multiplying the Facility 2 data by the ratio of predicted target variable values.

$$EV_1 = (674.3)(7) + (10.4)(470) + (440.7)(1.000) + (-46.0)(0.00) = 10,048.8$$

$$EV_2 = (674.3)(1) + (10.4)(97) + (440.7)(0.979) + (-46.0)(-1.92) = 2,202.9$$

Now converting Facility 2 Target Value to compare with Facility, the ratio of the Equivalent values as shown below is used.

$$Equiv_{2\text{-}1} = \$2,202 * 10,048.8 / 2,202.9 = \$9,497.5$$

Facility 1's target value can now be compared to that of Facility 2. The difference is $9,497.5−$6,690=$2,807.5. Facility 1 is operating at a lower OPEX than Facility 2. The difference may represent a gap closure opportunity for Facility 2, if the reasons for the lower OPEX in Facility 1 can be determined.

The gap of each facility to the analysis set average performance can also be determined from the equation below. For the current example the gap can be calculated as shown below:

$$GAP_1 = \$10,048.8 - \$6,690 = +\$3,358.8$$

$$GAP_2 = \$2,202.9 - \$2,082 = +\$120.9$$

This procedure can be expanded to the entire population of 2 or more facilities to be included in the study.

Referring to FIG. 9, an illustrative node 40 for implementing the method is depicted. Node 40 can be any form of computing device, including computers, workstations, hand helds, mainframes, embedded computing device, holographic computing device, biological computing device, nanotechnology computing device, virtual computing device and or distributed systems. Node 40 includes a microprocessor 42, an input device 44, a storage device 46, a video controller 48, a system memory 50, and a display 54, and a communication device 56 all interconnected by one or more buses or wires or other communications pathway 52. The storage device 46 could be a floppy drive, hard drive, CD-ROM, optical drive, bubble memory or any other form of storage device. In addition, the storage device 42 may be capable of receiving a floppy disk, CD-ROM, DVD-ROM, memory stick, or any other form of computer-readable medium that may contain computer-executable instructions or data. Further communication device 56 could be a modem, network card, or any other device to enable the node to communicate with humans or other nodes.

While the invention has been shown and described with reference to the preferred embodiment thereof, it will be understood by those skilled in the art that various changes in form and detail may be made therein without departing from the spirit and scope of the invention.

What is claimed is:

1. A method for using computer-readable medium comprising a plurality of instructions for execution by at least one computer processor, the instructions for determining equivalency factors and first principle characteristics which are industrial facility's physical and operational attributes that are expected to determine a target variable that is a unique quantifiable attribute used to measure performance between facilities comprising the steps of:
    ascertaining a list of possible attributes that describe the technology, configuration, size and operational activity of the facilities;
    computing a percentage target variable variation influence from candidates of the first principle characteristics;
    ranking the percentage target variable variation influence for each of the first principle characteristics candidate from highest to lowest;
    grouping variations of the first principle characteristics candidate into categories;
    selecting the first principle characteristics candidates above a user-specified level of average variation;
    selecting the first principle characteristics candidates with less than a user-specified first principle characteristic inter-dependence;
    selecting the first principle characteristics candidates with less than a user-specified first principle characteristic co-variance;
    determining developed characteristics which are user-specified functions of the first principle characteristics that are comprised of ordinal or rank-based variables;
    determining the equivalency factors wherein the equivalency factors are computed from the plurality of selected first principle characteristics and the developed characteristics of the target variable using the equation $\{\alpha_j, j=1 \text{ to } n\}$ where n is the number of the selected first principle characteristics and the developed characteristics using a non-linear optimization procedure to minimize the total error, $\{\epsilon_i, i=1 \text{ to } m\}$, where m is the number of facilities, between actual and predicted target variable values as given by:

$$TV_i = \sum_{j=1}^{n} \alpha_j * C_{ij} + \varepsilon_i, i = 1, m$$

where $C_{ij}$ = the first principle or developed characteristic j of the $i_{th}$ facility
n = number of selected first principle and developed characteristics
m = number of facilities; and
outputting the equivalency factors from the computer-readable medium for use in measuring the performance between the facilities.

2. The method of claim 1 where the absolute error has the form:

$$\text{Absolute Error} = \left[\sum_{i=1}^{m} |A_i - P_i|^p\right]^{1/p}, p \geq 1$$

where: $A_i$ = actual value of target variable for industrial facility i
$P_i$ = predicted value of target variable for industrial facility i
m = total number of facilities.

3. The method of claim 2 where the relative error has the form:

$$\text{Relative Error} = \begin{cases} \left[\sum_{i=1}^{m} \frac{|A_i - P_i|^p}{A_i}\right]^{1/p}, p \geq 1, A_i \neq 0 \\ 0, A_i = 0 \end{cases}$$

where: $A_i$ = actual value of target variable for industrial facility i
$P_i$ = predicted value of target variable for industrial facility i
m = total number of facilities.

4. The method of claim 1 where the non-linear optimization procedure to minimize the total error $\{\epsilon_i, i=1 \text{ to } m\}$ incorporates range and value constraints on the equivalency factors.

5. The method of claim 4 where the target variable for an industrial facility is a target variable for a refining facility.

6. The method of claim 4 where the target variable for an industrial facility is a target variable for a petrochemical facility.

7. The method of claim 4 where the target variable for an industrial facility is a target variable for a pipeline facility.

8. The method of claim 4 where the target variable for an industrial facility is a target variable for a pipeline system.

9. The method of claim 4 where the target variable for an industrial facility is a target variable for a tank farm facility.

10. The method of claim 4 where the target variable for an industrial facility is a target variable for a combined pipeline and tank farm facility.

11. The method of claim 4 where the target variable for an industrial facility is a target variable for a power generating facility.

12. The method of claim 4 where the target variable for an industrial facility is a target variable for a power distribution facility.

13. The method of claim 4 where the target variable for an industrial facility is a target variable for a chemical manufacturing facility.

14. The method of claim 4 where the target variable for an industrial facility is a target variable for an environmental aspect.

15. The method of claim 4 where the target variable is the total operating expense of an industrial facility.

16. The method of claim 4 where the target variable is the operating cost of an industrial facility.

17. The method of claim 4 where the target variable is a financial result of operation of an industrial facility.

* * * * *